US011002935B2

(12) United States Patent
Dowling

(10) Patent No.: US 11,002,935 B2
(45) Date of Patent: May 11, 2021

(54) MST EXPANSION CLOSURES; AND METHODS

(71) Applicant: COMMSCOPE TECHNOLOGIES LLC, Hickory, NC (US)

(72) Inventor: Douglas Ferris Dowling, Cary, NC (US)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 16/640,011

(22) PCT Filed: Aug. 13, 2018

(86) PCT No.: PCT/US2018/046446
§ 371 (c)(1),
(2) Date: Feb. 18, 2020

(87) PCT Pub. No.: WO2019/036339
PCT Pub. Date: Feb. 21, 2019

(65) Prior Publication Data
US 2020/0249403 A1 Aug. 6, 2020

Related U.S. Application Data

(60) Provisional application No. 62/547,211, filed on Aug. 18, 2017.

(51) Int. Cl.
*G02B 6/44* (2006.01)
*G02B 6/38* (2006.01)
(52) U.S. Cl.
CPC .......... *G02B 6/4472* (2013.01); *G02B 6/3825* (2013.01); *G02B 6/3897* (2013.01)

(58) Field of Classification Search
CPC .. G02B 6/3825; G02B 6/3837; G02B 6/3861; G02B 6/3897; G02B 6/4472; G02B 6/4441; G02B 6/4442; G02B 6/4444; G02B 6/4448; G02B 6/4477; G02B 6/4492; G02B 6/4454; G02B 6/4401; G02B 6/4416; G02B 6/445
USPC .................................. 385/53–78, 135–139
See application file for complete search history.

(56) References Cited

U.S. PATENT DOCUMENTS

| 5,317,663 | A | 5/1994 | Beard et al. |
| 5,434,944 | A | 7/1995 | Kerry et al. |
| 7,120,347 | B2 | 10/2006 | Blackwell, Jr. et al. |
| 7,292,763 | B2 | 11/2007 | Mertesdorf et al. |
| 7,317,863 | B2 | 1/2008 | Lu et al. |
| 7,477,826 | B2 | 1/2009 | Mullaney et al. |
| 7,489,849 | B2 | 2/2009 | Reagan et al. |

(Continued)

FOREIGN PATENT DOCUMENTS

| WO | 2015/197588 A1 | 12/2015 |
| WO | 2016/024014 A1 | 2/2016 |
| WO | 2016/156610 A1 | 10/2016 |

OTHER PUBLICATIONS

International Search Report and Written Opinion of the International Searching Authority for International Patent Application No. PCT/US2018/046446 dated Dec. 7, 2018, 7 pages.

*Primary Examiner* — Michael P Mooney
(74) *Attorney, Agent, or Firm* — Merchant & Gould P.C.

(57) ABSTRACT

The present disclosure relates to an optical fiber distribution system that can be expanded to selectively add a number of ruggedized fiber optic adapter ports for connecting to customer premises.

20 Claims, 15 Drawing Sheets

(56) References Cited

U.S. PATENT DOCUMENTS

| | | |
|---|---|---|
| 7,572,065 B2 | 8/2009 | Lu et al. |
| 8,135,256 B2 | 3/2012 | Solheid et al. |
| 8,861,919 B2 | 10/2014 | Alston et al. |
| 8,961,035 B2 | 2/2015 | LeBlanc et al. |
| 9,482,829 B2 | 11/2016 | Lu et al. |
| 2005/0163448 A1 | 7/2005 | Blackwell, Jr. et al. |
| 2005/0213921 A1 | 9/2005 | Mertesdorf et al. |
| 2006/0093303 A1* | 5/2006 | Reagan ............... G02B 6/4466 385/135 |
| 2006/0153517 A1 | 7/2006 | Reagan et al. |
| 2007/0104448 A1 | 5/2007 | Allen |
| 2009/0252462 A1 | 10/2009 | Bonical |
| 2013/0243386 A1 | 9/2013 | Pimentel et al. |

* cited by examiner

MST EXPANSION CLOSURES; AND METHODS

CROSS-REFERENCE TO RELATED APPLICATION

This application a National Stage Application of PCT/US2018/046446, filed on Aug. 13, 2018, which claims the benefit of U.S. Patent Application Ser. No. 62/547,211, filed on Aug. 18, 2017, the disclosures of which are incorporated herein by reference in their entireties. To the extent appropriate, a claim of priority is made to each of the above disclosed applications.

TECHNICAL FIELD

The present disclosure relates to fiber optic networks, and more particularly, to fiber drop terminals in fiber optic networks.

BACKGROUND

Fiber optic telecommunication technology is becoming prevalent in part because service providers want to deliver high bandwidth communication capabilities to subscribers. One such technology is referred to as passive optical networks (PONS). PONS may use optical fibers deployed between a service provider central office, or head end, and one or more end user premises. A service provider may employ a central office, or head end, containing electronic equipment for placing signals onto optical fibers running to user premises. End user premises may employ equipment for receiving optical signals from the optical fibers. In PONS, the central office, or head end, transmission equipment and/or the transmission equipment located at the end user premises may, respectively, use a laser to inject data onto a fiber in a manner that may not require the use of any active components, such as amplifiers between the central office, or head end, and/or the end user premises. In other words, only passive optical components, such as splitters, optical fibers, connectors and/or splices, may be used between a service provider and an end user premises in PONS. PONS may be attractive to service providers because passive networks may be less costly to maintain and/or operate as compared to active optical networks and/or older copper based networks, such as a public switched telephone network (PSTN). In addition to possibly being less expensive than other network topologies, PONS may provide sufficient bandwidth to meet a majority of end users' high bandwidth communication needs into the foreseeable future. In other network architectures, such as fiber-to-the-distribution point, optical service is provided to locations short of the final subscriber locations, and electrical lines (e.g., co-axial cable, twisted pair cable) define the final leg to the subscriber locations.

In optical networks, transmission equipment may transmit signals containing voice, data and/or video over a fiber strand. An optical fiber may be split using, for example, passive optical splitters so that signals are dispersed from one fiber (the input fiber) to multiple output fibers running to, for example, user premises from a convergence point in the network or to an intermediate node or distribution point. An optical fiber routed to a user's premises or to a distribution point may be coupled to a fiber drop terminal. Fiber drop terminals may be mounted in aerial applications, such as near the tops of utility poles, along multi-fiber and/or multi-conductor copper strands suspended between utility poles. Fiber drop terminals may also be installed in junction boxes mounted at ground level and/or in below-grade vaults where utilities are run below ground. Example fiber drop terminals are disclosed at U.S. Pat. No. 7,120,347; U.S. Patent Publication No. 2005/0213921; and U.S. Patent Publication No. 2006/0153517. Basically, drop terminals provide exterior access points located in the vicinity of subscriber locations for allowing the optical network to be readily accessed.

A fiber distribution terminal, such as a fiber distribution hub, may be configured to receive fibers from a central office and contain one or more optical power splitters. Typically, fiber can be routed through an optical splitter to convert each input fiber into "n" number of active fibers. Splitters are typically referred to as 1×n where "n" represents the number of output fibers. The output fibers of the splitter may be optically coupled to a distribution cable that is routed from the fiber distribution hub to a location or locations closer to the outer edge of the network. Often, the optical fibers of the distribution cable are optically coupled to ports of drop terminals. The drop terminal is typically in the general vicinity of subscriber locations.

Based on the conventional architecture of existing fiber drop terminals, it may be difficult to add expansion later because the fiber drop terminals usually have a fixed capacity. In certain circumstances, the fiber drop terminals may include extra ports or stranded ports until subscribers take service and are coupled to the ports. However, this approach only allows for limited expansion and increases cost at the front end in order to accommodate unknown/unexpected expansion.

Usually, once all available active ports are assigned, a technician would be required to add a cable to the network to provide service for a new subscriber. As a result, substantial effort and cost may be required to include additional ports.

There is a desire for inexpensive ways to expand service capacity over time. That is, a deferred investment of including extra ports for expansion over time without investing too much at the front end or without having to run a cable back through the network. As a result, the cost of expansion can be delayed while still allowing for expansion.

SUMMARY

The present disclosure relates to an optical fiber distribution system that can be expanded to selectively add a number of ruggedized fiber optic adapter ports for connecting to customer premises.

One aspect of the present disclosure relates to an optical termination enclosure. The enclosure can include a fiber optic cable that has a plurality of optical fibers; a housing that defines a sealed cable entry port to provide access for the fiber optic cable to be routed therethrough; and at least one ruggedized fiber optic adapter port at the housing. The at least one ruggedized fiber optic adapter port can be accessible from outside the housing and can be configured to receive a ruggedized fiber optic connector. The plurality of optical fibers of the fiber optic cable can include at least one terminated optical fiber that is optically coupled to the at least one ruggedized fiber optic adapter port and at least one unterminated optical fiber. The at least one unterminated optical fiber can be retractably stored within the housing. The at least one unterminated optical fiber can be configured to be pulled out from the housing through the fiber optic cable and the sealed cable entry port to provide fiber access for expanding service capacity overtime.

Another aspect of the present disclosure relates to a method of using an optical termination enclosure. The method includes the following steps: 1) opening a portion of a jacket of a fiber optic cable to form a jacket opening at a distance spaced from a housing to expose the plurality of optical fibers contained therein; and 2) pulling at least one unterminated optical fiber from the jacket opening to pull a stored portion of the at least one unterminated optical fiber out of the housing through the fiber optic cable and out of the fiber optic cable through the jacket opening.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

The system depicted herein is adapted to expand service capacity overtime. A desired number of optical fibers of a distribution cable can be optically coupled to ports of a drop terminal to provide service to subscribers. Unterminated optical fibers of the distribution cable can be retractably stored within a housing of the drop terminal for later use. When it is desirable to add a new subscriber to the network, the unterminated optical fibers can be pulled out of the housing through an access opening of the distribution cable jacket. An enclosure including adapter ports can be mounted over the access opening to provide an environmental seal. The unterminated optical fibers can be connectorized and plugged into the new adapter ports of the enclosure. That is, the system can be expanded to include new ports as needed, which requires less effort and cost compared with a system that includes stranded or empty ports to later accommodate subscribers when they take service.

Figure 1:
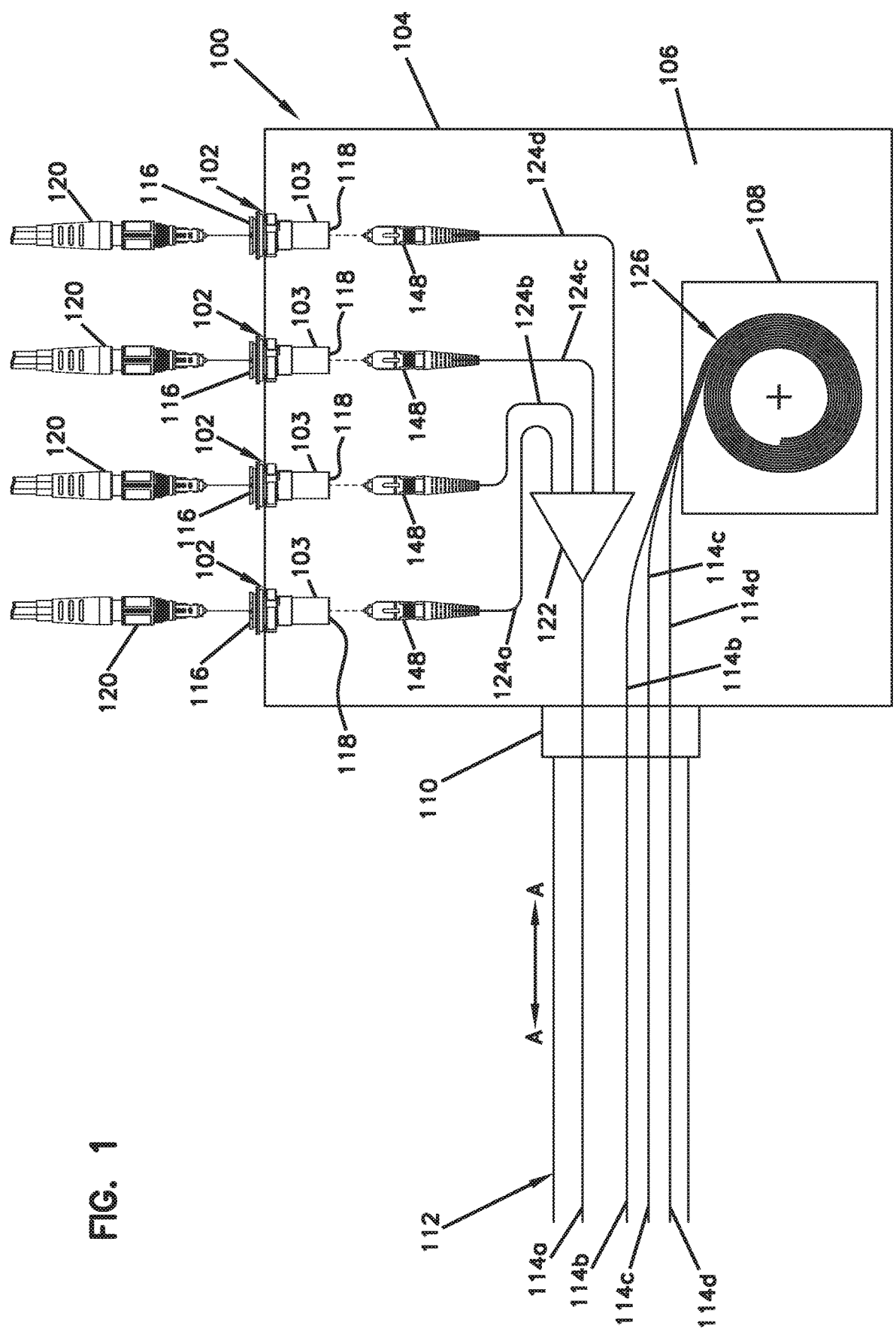
FIG. 1 is a schematic view of a multiport service terminal having ruggedized fiber optic adapter ports and a fiber optic cable with four optical fibers routed therethrough, four optical fibers are shown optically coupled to respective ruggedized fiber optic adapter ports through a splitter and three unterminated optical fibers are shown retractably stored within a housing of the multiport service terminal in accordance with the principles of the present disclosure.

FIG. 1 illustrates a schematic view of an example fiber optic drop terminal 100 (e.g., multiport service terminal, splitter terminal) that may include multiple ruggedized (e.g., hardened) fiber optic adapter ports 102, a housing 104 shaped to form an inner cavity 106 for housing optical fibers, and a retractable storage 108 located in a portion of the inner cavity 106 of the housing 104 for storing unterminated optical fibers (e.g., excess optical fibers). The fiber optic drop terminal 100 can alternatively include other optical enclosures/housings (e.g., pedestals, network interface devices, fiber distribution hubs, splice enclosures, optical network terminals, etc.).

By hardened or ruggedized, it is meant that fiber optic adapter ports or connectors are adapted for outside environmental use. For example, ruggedized fiber optic adapter ports and ruggedized fiber optic connectors can include environmental seals for preventing moisture/water intrusion.

Figure 2:
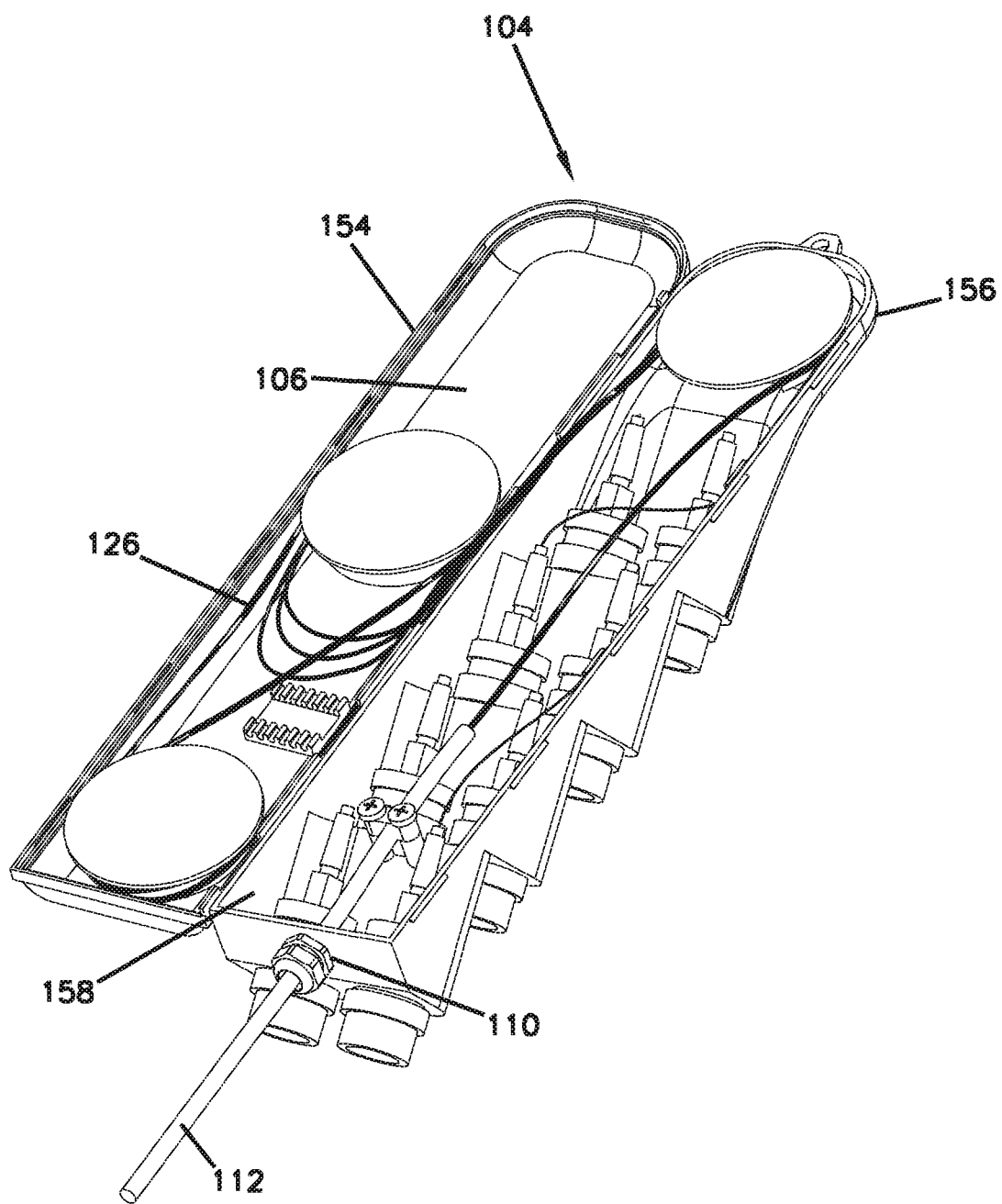
FIG. 2 is a perspective view of an example multiport service terminal with first and second housing pieces in accordance with the principles of the present disclosure.
Figure 3:
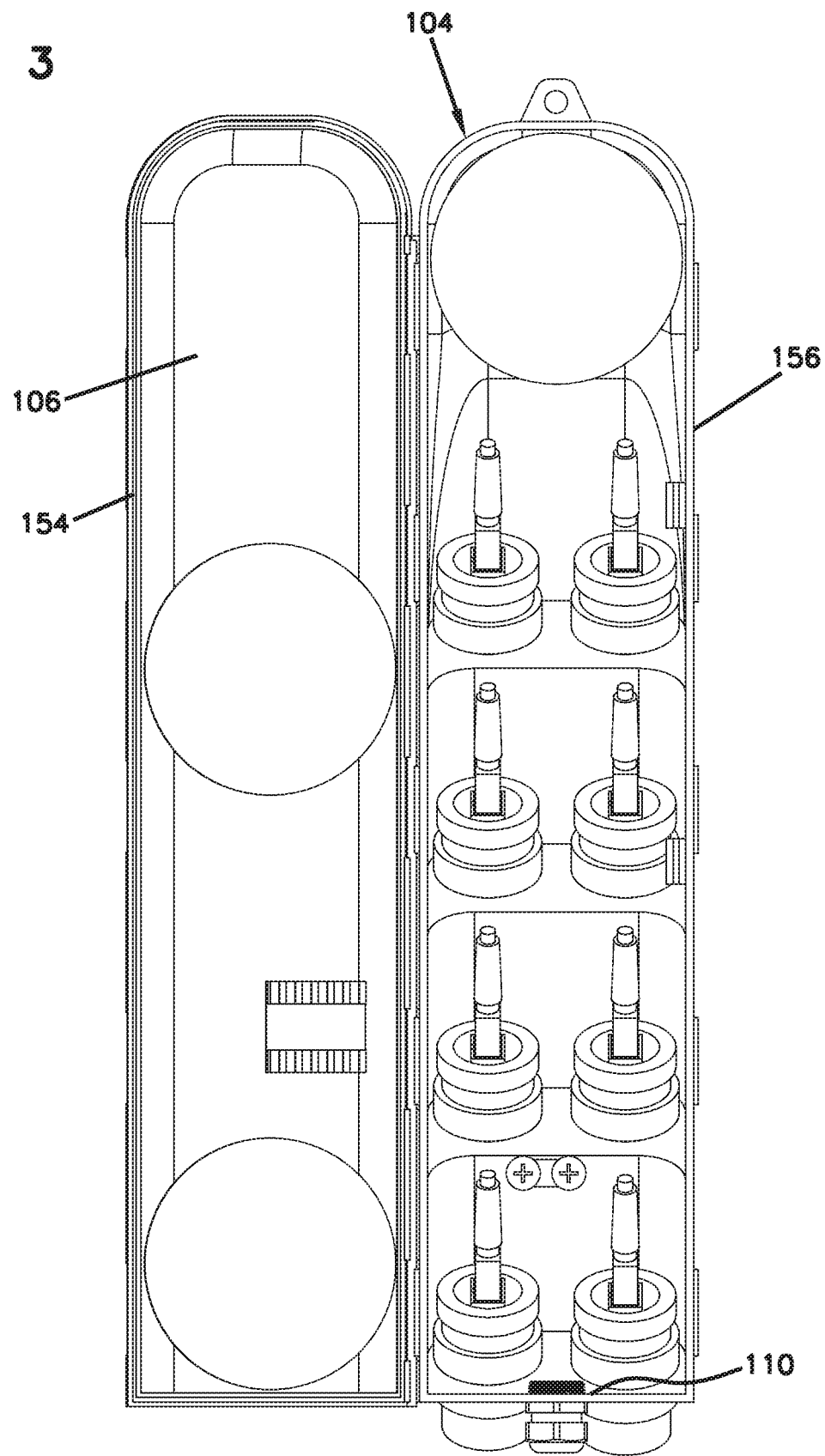
FIG. 3 is a front view of the multiport service terminal of FIG. 2.

Turning to FIGS. 2-3, the housing 104 can include a first housing piece 154 and a second housing piece 156. The second housing piece 156 can be positioned opposite the first housing piece 154, the first and second housing pieces together enclosing an interior 158 of the housing 104. In certain examples, the first housing piece 154 defines the inner cavity 106 in which the unterminated optical fibers $114_{b-d}$ are disposed. In certain examples, the second housing piece 156 includes the ruggedized fiber optic adapter ports 102. The first and second housing pieces 154, 156 can be movable relative to one another between open and closed positions. The first and second housing pieces 154, 156 may each be formed of any suitable material. According to some embodiments, the first and second housing pieces 154, 156 are formed of a polymeric material. Suitable polymeric materials may include, polypropylene and its derivatives, or polycarbonate, for example, although alternatives are possible.

With continued reference to FIG. 1, the housing 104 may define a sealed cable entry port 110 to provide access for a fiber optic cable 112 to be routed therethrough. That is, the fiber optic cable 112 may enter the fiber optic drop terminal 100 by way of the sealed cable entry port 110. The fiber optic cable 112 has a longitudinal or lengthwise cable axis A-A. The sealed cable entry port 110 may consist of a passage or tubular entrance through which the fiber optic cable 112 having the lengthwise cable axis A-A may pass. The sealed cable entry port 110 anchors the fiber optic cable 112 and provides strain relief. The fiber optic cable 112 may be sealed to the sealed cable entry port 110 using, for example, potting techniques, gels, glands or other known sealing methods.

The fiber optic cable 112 may include one or more input optical fibers 114. For example, the fiber optic cable 112 may contain, for example, 4, 6, 8, 10, 12, or more fibers. In the example depicted, four input optical fibers $114_{a-d}$ are routed through the fiber optic cable 112. The input optical fibers $114_{a-d}$ may be fanned out from the fiber optic cable 112 once inside the inner cavity 106 of the housing 104. The input optical fibers 114 may be formed of glass, for example. The input optical fibers 114 may be enclosed within a protective sheath, or tube that can be clear or color coded, for coupling incoming optical signals with output connectors via output receptacles 116 (e.g., outer port, a hardened port) of a ruggedized fiber optic adapter 103. The output receptacles 116 of the ruggedized fiber optic adapters 103 can be accessible from outside the housing 104 and can be configured to receive a ruggedized (e.g., hardened) fiber optic connector 120.

Multiple ruggedized fiber optic adapter ports 102 can be provided at the housing 104. For example, if the fiber optic drop terminal 100 includes four ruggedized fiber optic adapter ports 102, the fiber optic cable 112 may include four input optical fibers $114_{a-d}$. That is, an incoming optical fiber may be associated with a particular ruggedized fiber optic adapter port 102. The quantity of fibers within the fiber optic cable 112 may match the number of ruggedized fiber optic adapter ports 102 and/or may exceed the number of ruggedized fiber optic adapter ports 102.

In certain examples, the input optical fibers $114_{a-d}$ may terminate with an industry standard SC/APC connector 148 (e.g., non-ruggedized connector). In certain examples, at least one of the input optical fibers $114_{a-d}$ may be terminated with the SC/APC connector 148 to form a terminated optical fiber that can be optically coupled to at least one of the ruggedized fiber optic adapter ports 102. The SC/APC connector 148 can be plugged into an input receptacle 118 (e.g., inner port, unhardened port) of the ruggedized fiber optic adapter 103. That is, the input optical fibers $114_{a-d}$ may be terminated with a mating input connector for coupling optical signals to the input receptacles 118. In certain examples, the fiber optic connector can include a ferrule 101 (see FIG. 4). In other examples, the fiber optic connector can be ferrule-less. In certain examples, the fiber optic connector can include a single fiber or multi-fiber.

As used herein, the term "optically coupled" means connected by an optical signal path. In certain examples, at least one of the input optical fibers $114_{a-d}$ may remain unterminated.

Figure 4:
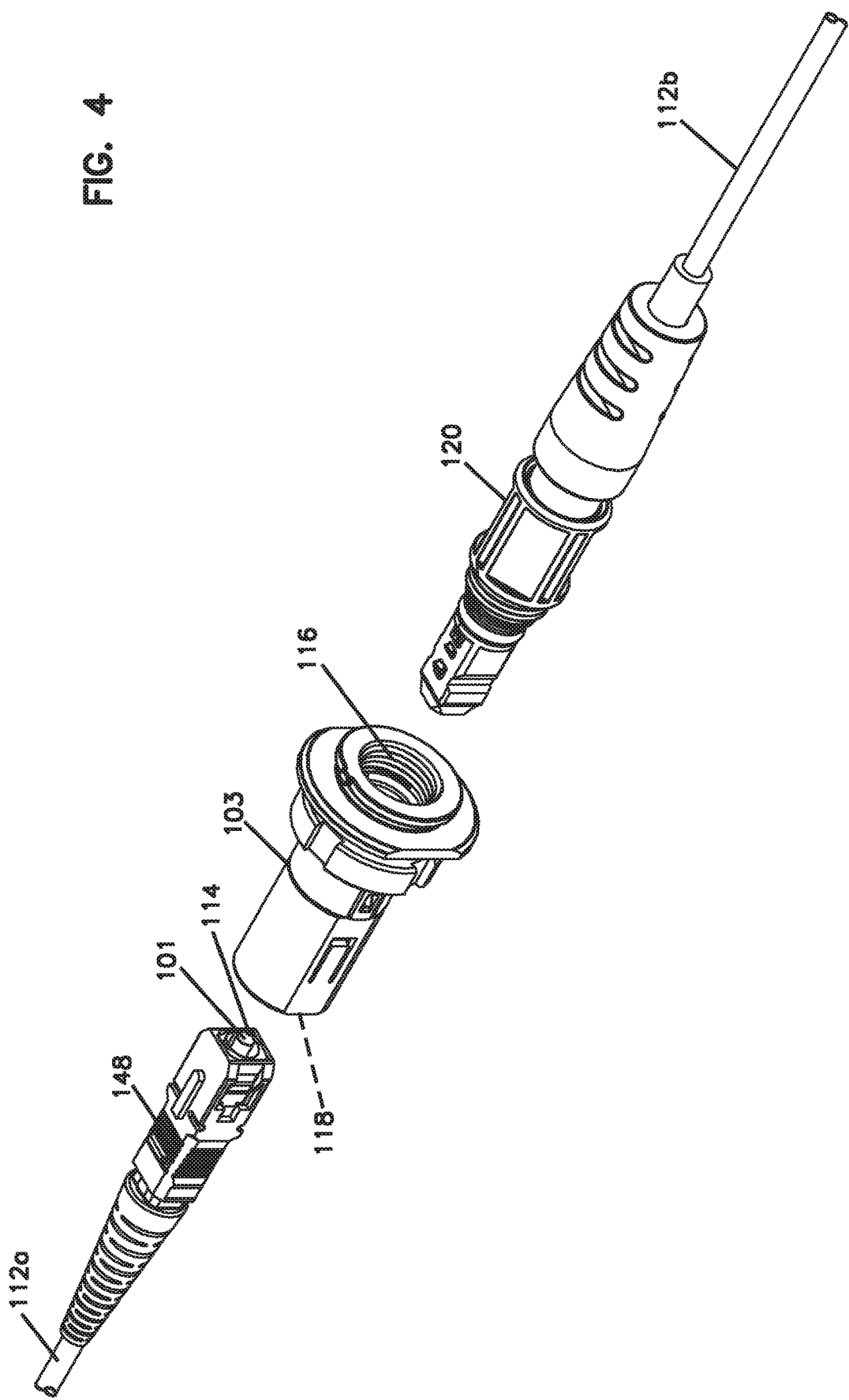
FIG. 4 is a perspective view of a SC connector disconnected from a hardened fiber optic adapter and a hardened fiber optic connector also disconnected from the hardened fiber optic adapter.

FIG. 4 depicts a first fiber optic cable 112a that is directly terminated at the SC connector 148 and a second fiber optic cable 112b that is terminated at the ruggedized fiber optic connector 120 via the hardened fiber optic adapter 103. The SC connector 148 is connected at the input receptacle 118 of the ruggedized fiber optic adapter 103 and the ruggedized fiber optic connector 120 is connected at the output receptacle 116 of the ruggedized fiber optic adapter 103. In a preferred embodiment, the ruggedized fiber optic adapter 103 can be mounted through a properly sized opening in the housing 104. A sealing member can be provided to environmentally seal the ruggedized fiber optic adapter 103 around the opening of the housing 104. The ruggedized fiber optic adapter 103 includes the input receptacle 118 for receiving the SC connector 148 and the output receptacle 116 for receiving ruggedized fiber optic connector 120. One example of an adapter is illustrated and described at U.S. patent application Ser. No. 11/657,402 entitled HARDENED FIBER OPTIC CONNECTOR, filed Jan. 24, 2007, that is hereby incorporated by reference in its entirety. Another example of hardened fiber optic adapters mounted to a drop terminal is illustrated and described at U.S. patent application Ser. No. 11/075,847, entitled FIBER ACCESS TERMINAL, filed on Mar. 8, 2005, now U.S. Pat. No. 7,292,763, and that is hereby incorporated by reference in its entirety. In certain examples, the first fiber optic cable 112a can be a connectorized fiber from the drop terminal 100 to a fiber break-out location of a fiber distribution cable and the second fiber optic cable 112b can be a drop cable routed to a subscriber premises. Example fiber break-out configurations are disclosed at U.S. patent application Ser. No. 11/491,336, entitled FIBER OPTIC CABLE BREAKOUT CONFIGURATION WITH RETENTION BLOCK, filed on Jul. 21, 2006, now U.S. Pat. No. 7,317,863, and that is hereby incorporated by reference in its entirety. In another embodiment, one or more of the adapters can be mounted to a network interface device of the type disclosed at U.S. patent application Ser. No. 11/607,676, entitled NETWORK INTERFACE DEVICE, filed on Dec. 1, 2006, and that is hereby incorporated by reference in its entirety. In such an embodiment, the second fiber optic cable 112b is an external cable, such as a drop cable, and the first fiber optic cable 112a is an internal cable and can include a connectorized cable/fiber positioned within the network interface device. The first fiber optic cable 112a is optically coupled to the second fiber optic cable 112b when the connectors 148, 120 are positioned within their respective receptacles 116, 118 of the ruggedized fiber optic adapter 103. One example of an SC connector 148 is illustrated and described at U.S. Pat. No. 5,317,663, which is hereby incorporated by reference in its entirety.

With continued reference to FIG. 1, at least one of the input optical fibers $114_{a-d}$ can be routed to a splitter 122 to be split into four separate optical fiber lines $124_{a-d}$, although alternatives are possible. Once split, the optical fiber lines $124_{a-d}$ can be optically coupled to the ruggedized fiber optic adapter ports 102 of the housing 104 through the splitter 122. The remaining unterminated optical fibers $114_{b-d}$ can be stored in the housing 104 until needed. That is, a stored portion 126 of the unterminated optical fibers $114_{b-d}$ may be retractably stored within the housing 104. In certain examples, there may be more or less unterminated optical fibers 114 stored within the housing 104. That is, 4, 6, 8, 10, 12 or more unterminated optical fibers 114 may be loosely stored or coiled within the housing 104.

In certain examples, the retractable storage 108 located within the housing 104 may be used for storing the unterminated optical fibers $114_{b-d}$. The retractable storage 108 can temporarily hold the unterminated optical fibers $114_{b-d}$ in a configuration that allows the unterminated optical fibers $114_{b-d}$ to be pulled out. In certain examples, the configuration is a figure-8 loop configuration, although alternatives are possible.

Figure 5:
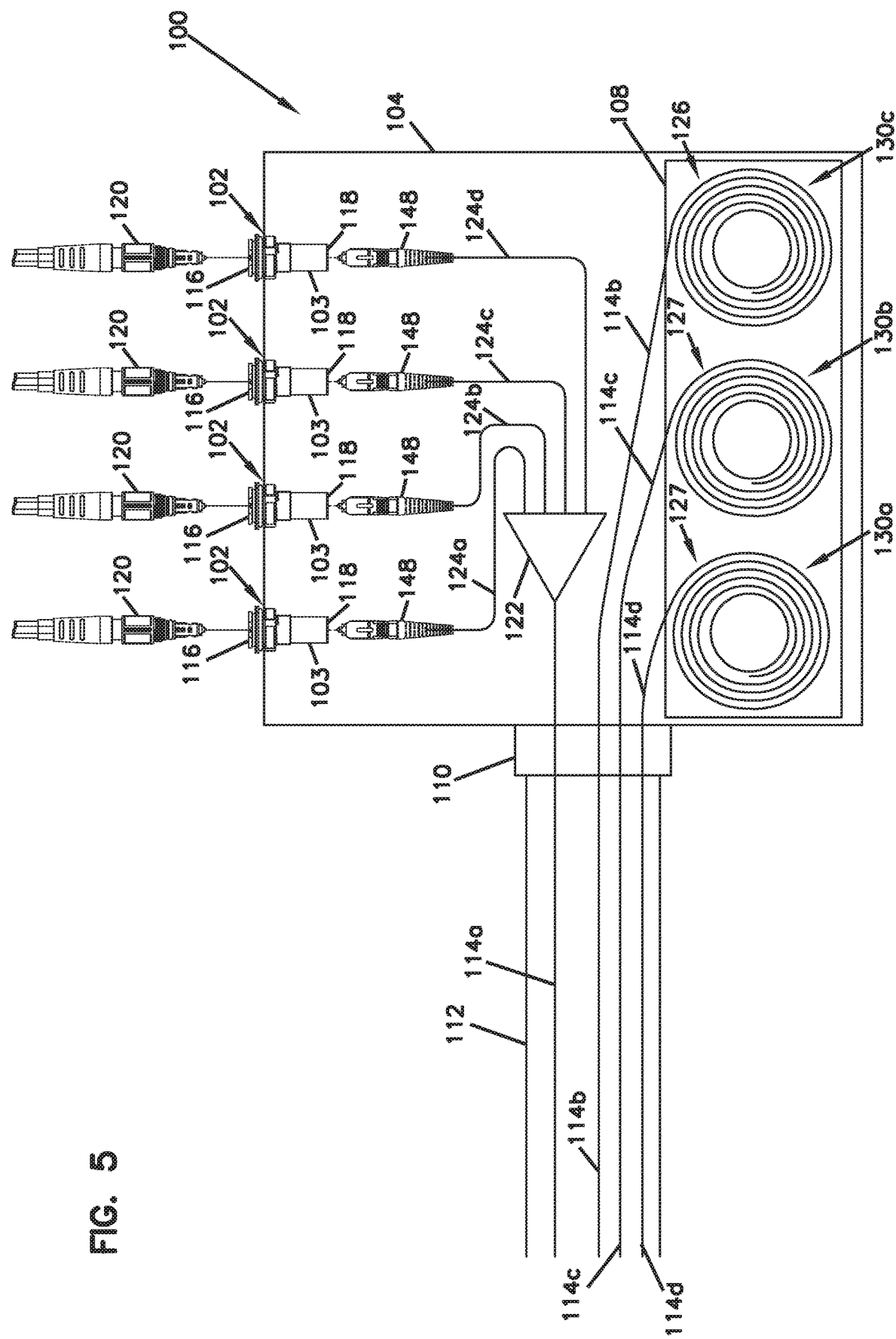
FIG. 5 is a schematic view of the multiport service terminal of FIG. 1 depicting the unterminated optical fibers coiled separately about spools.

In certain examples, the retractable storage 108 can include adhesive or tape to temporally hold the unterminated optical fibers $114_{b-d}$ while allowing the unterminated optical fibers $114_{b-d}$ to be pulled out when needed. In certain examples, the retractable storage 108 may include a separate tray that is adapted to store the unterminated optical fibers $114_{b-d}$. In certain examples, the retractable storage 108 may include one or more spools $130_{a-c}$ (see FIG. 5) that can rotate relative to the retractable storage 108 to allow the fibers to be pulled out, although alternatives are possible. In other examples, the spools $130_{a-c}$ may be fixed spools that allow the unterminated optical fibers $114_{b-d}$ to be pulled off, respectively. The unterminated optical fibers $114_{b-d}$ may be coiled about a respective one of the spools $130_{a-c}$ such that each unterminated optical fiber $114_{b-d}$ may be coiled about its own spool $130_{a-c}$ within the retractable storage 108, although alternatives are possible. In other examples, the optical fibers $114_{b-d}$ may be coiled without a spool. For example, fiber coils could be retained in a tray or other structure or can temporarily be held in coiled configurations by adhesive or tape. A relatively short amount of length of the unterminated optical fibers $114_{b-d}$ is preferably stored inside the retractable storage 108. In certain examples, less than 20 feet of the unterminated optical fibers $114_{b-d}$ can be stored in the retractable storage 108, although alternatives are possible. In certain examples, less than 15 feet of the unterminated optical fibers $114_{b-d}$ can be stored in the retractable storage 108, although alternatives are possible. In certain examples, less than 10 feet of the unterminated optical fibers $114_{b-d}$ can be stored in the retractable storage 108, although alternatives are possible. One advantage of the fiber optic drop terminal 100 is not having the cost associated with needing to include extra adapters or connectors. That is, only fiber is stored within the fiber optic drop terminal 100.

Figure 6:
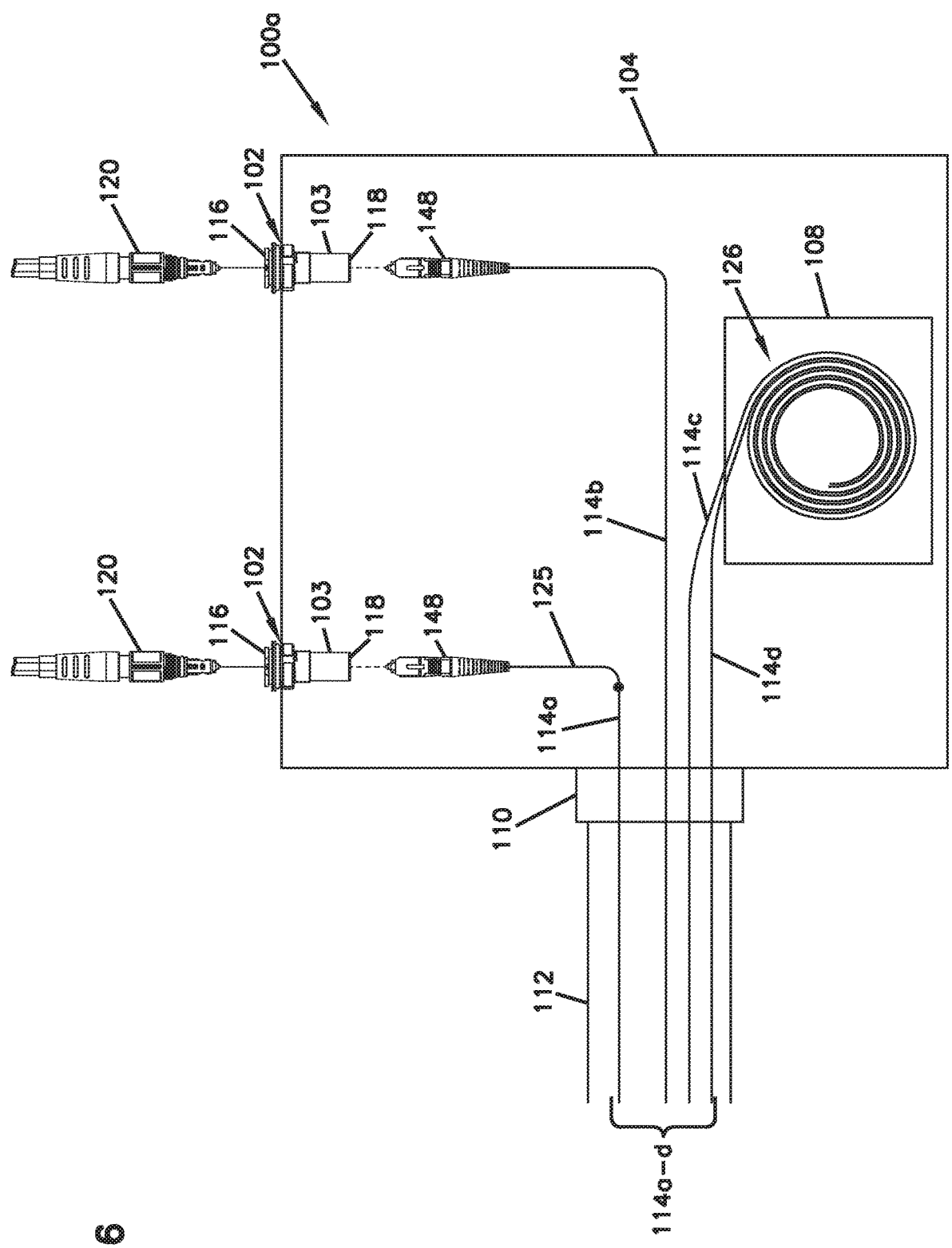
FIG. 6 is a schematic depiction of one of the optical fibers optically coupled to a ruggedized fiber optic adapter port by a splice on connector pigtail, and another optical fiber is shown optically coupled to a ruggedized fiber optic adapter port by direct termination in accordance with the principles of the present disclosure.

FIG. 6 shows a fiber optic drop terminal 100a without the splitter 122. At least one of the input optical fibers $114_{a-d}$ of the fiber optic cable 112 can be optically coupled to the ruggedized fiber optic adapter port 102 with a splice on connector pigtail 125. In other examples, at least one of the optical fiber lines $124_{a-d}$ may be optically coupled to the ruggedized fiber optic adapter ports 102 by direct termination.

Figure 7:
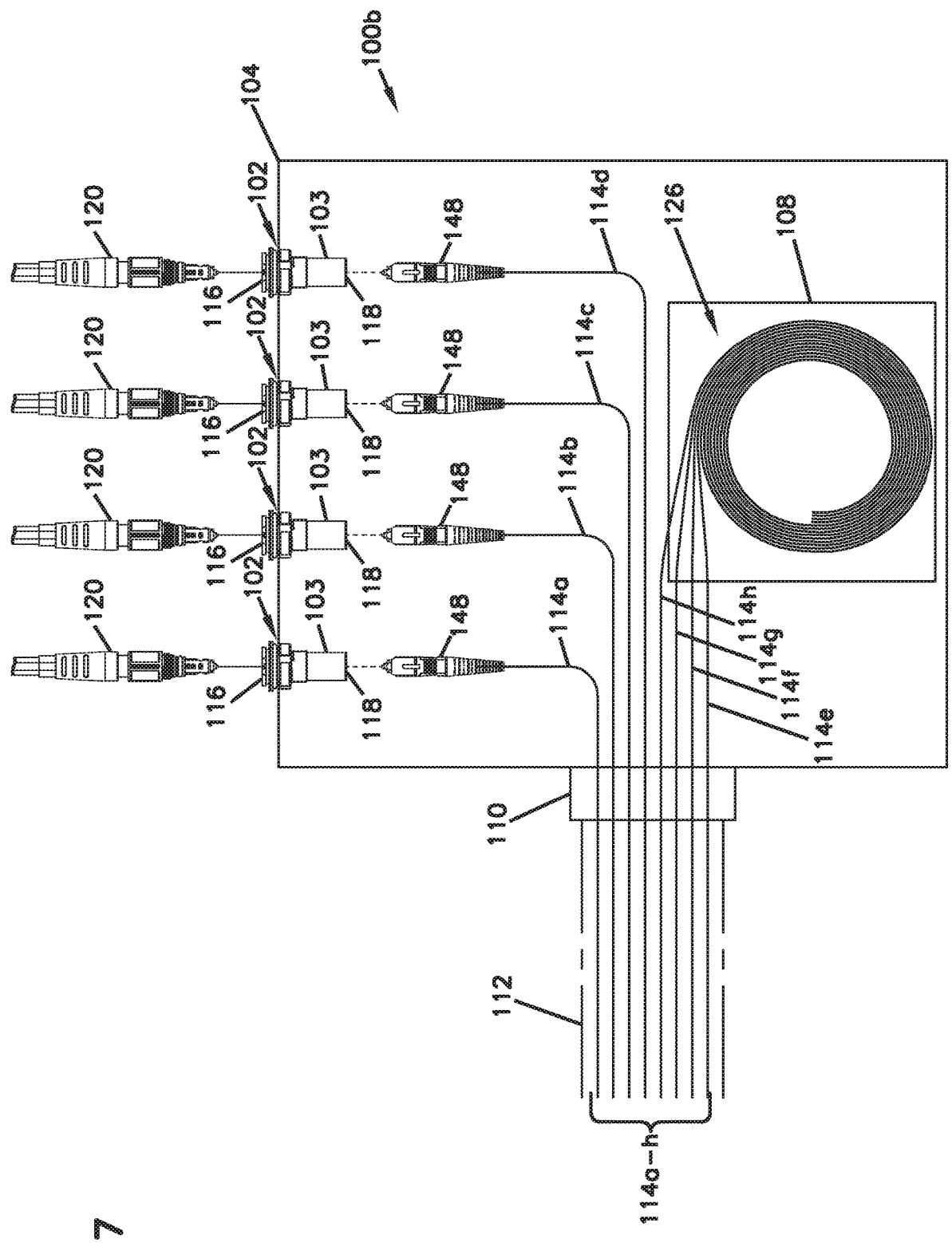
FIG. 7 is a schematic depiction of the multiport service terminal shown in FIG. 1 without the splitter in accordance with the principles of the present disclosure.

FIG. 7 depicts another fiber optic drop terminal 100b without the splitter 122. The fiber optic cable 112 has eight input optical fibers $114_{a-h}$ routed therethrough, although alternatives are possible. At least one of the optical fibers $114_{a-h}$ can be respectively optically coupled to the ruggedized fiber optic adapter ports 102 directly without going through the splitter 122. Any remaining unterminated optical fibers $114_{e-h}$ can be stored in the housing 104 until needed. In certain examples, the unterminated optical fibers $114_{e-h}$ may be stored in the retractable storage 108 of the housing 104.

When it is desired to add a new subscriber (e.g., customer) to the network, the unterminated optical fibers $114_{b-d}$ can be made available for providing such service.

Figure 8:
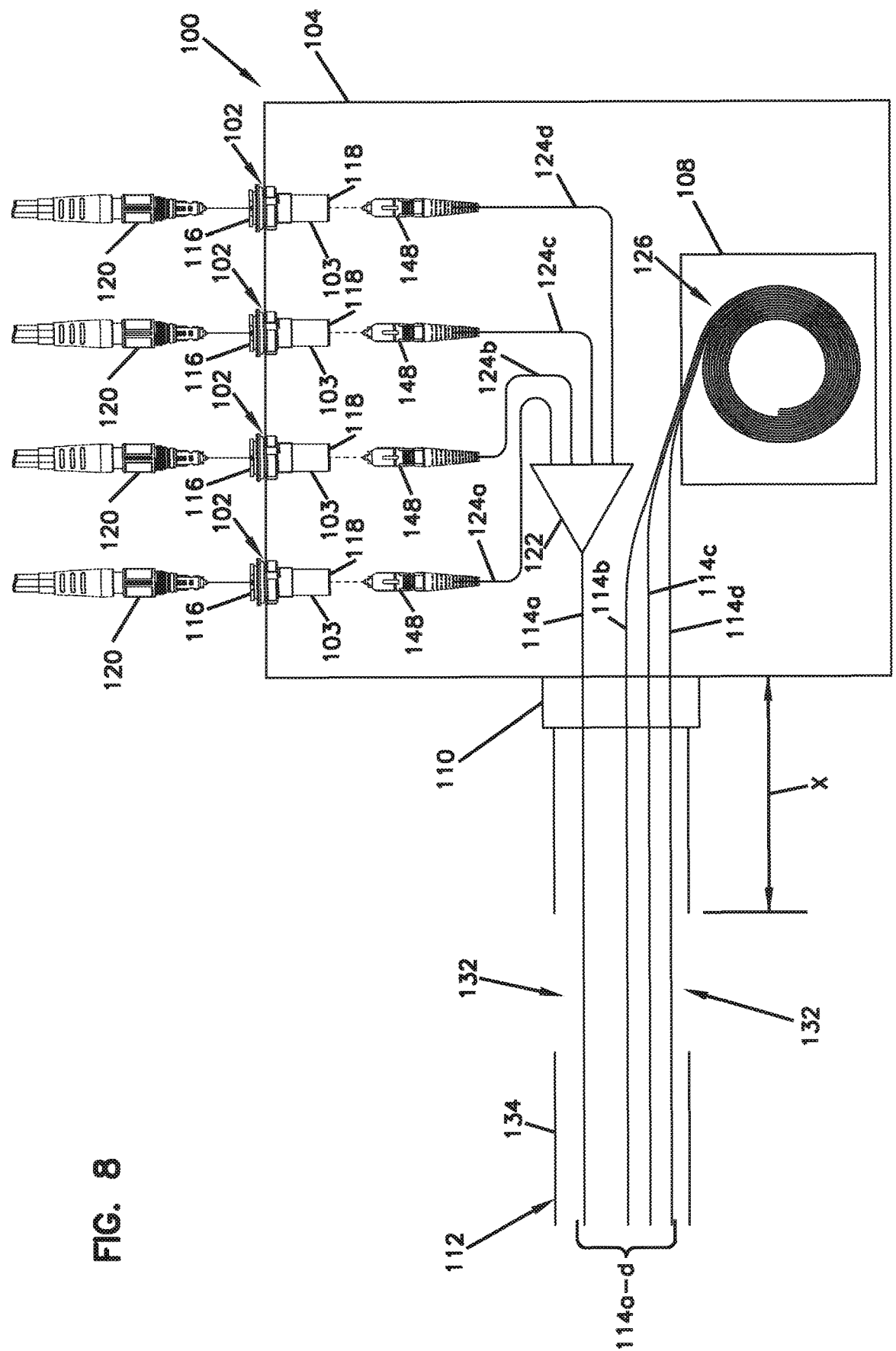
FIG. 8 is a schematic view of the multiport service terminal of FIG. 1 depicting an access opening in a jacket of the fiber optic cable.

Turning to FIG. 8, an access opening 132 (e.g., access location, mid-span entry) may be cut in a jacket 134 of the fiber optic cable 112. In certain examples, the access opening 132 may include a ring cut that can be slit to pull off a portion of the jacket 134. In certain examples, the access opening 132 may include a window that may be cut in the jacket 134. The access opening 132 can be located at a distance X along the fiber optic cable 112. The term, "distance X" referring to a region that is spaced from the fiber optic drop terminal 100. Variations of the distance X are possible. Often, the distance X of the access opening 132 is positioned less than 20 feet from the fiber optic drop terminal 100. Usually, the distance X of the access opening 132 is positioned less than 15 feet from the fiber optic drop terminal 100. Typically, the distance X of the access opening 132 is positioned less than 10 feet from the fiber optic drop terminal 100. In certain examples, the distance X of the access opening 132 is positioned less than 5 feet from the fiber optic drop terminal 100. Alternative distances X of the access opening 132 relative to the fiber optic drop terminal 100 are possible.

Figure 9:
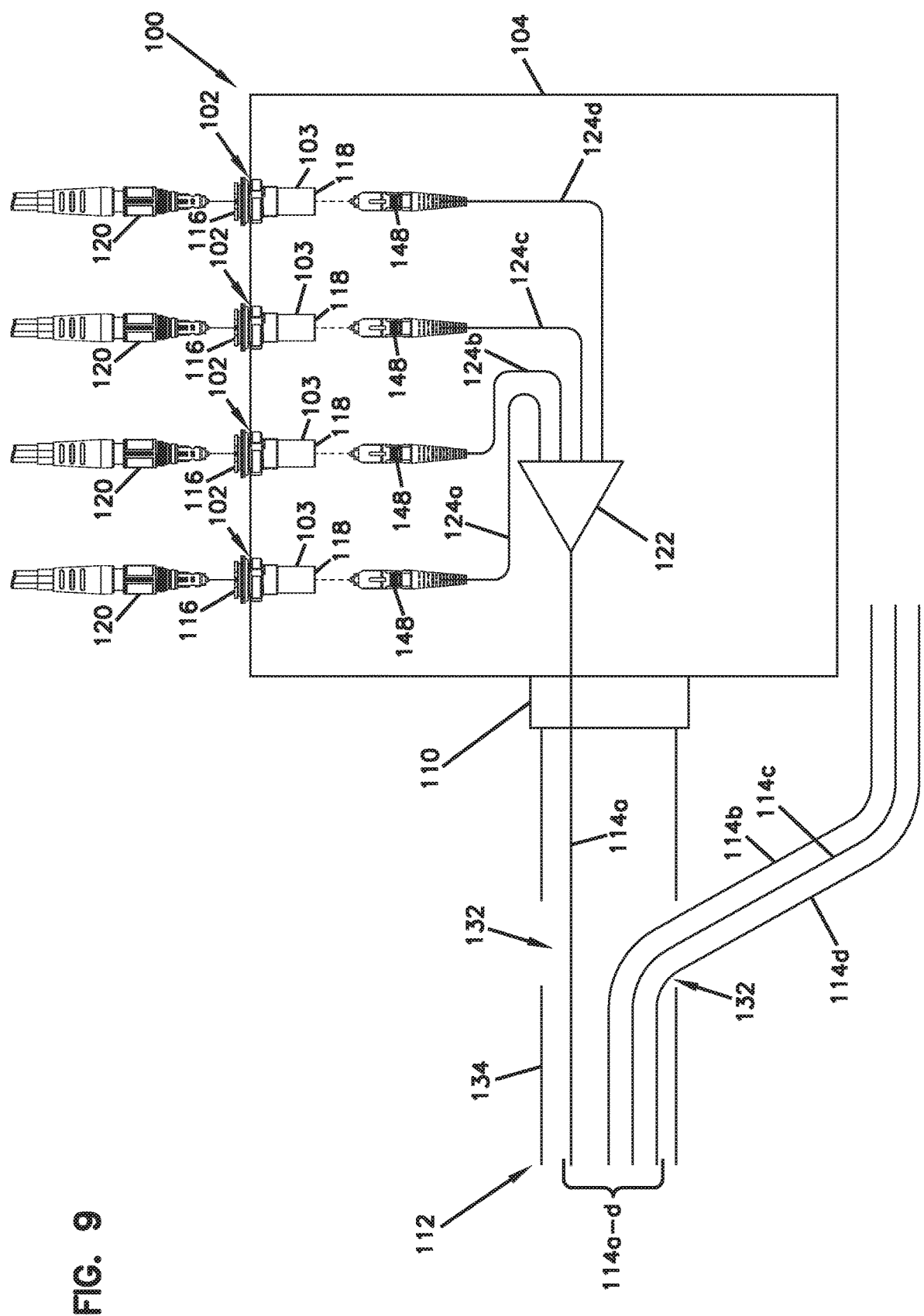
FIG. 9 is a schematic depiction of the three unterminated optical fibers pulled through the access opening of the fiber optic cable.

Referring to FIG. 9, the access opening 132 can provide access to the unterminated optical fibers $114_{b-d}$ of the fiber optic cable 112. Because the unterminated optical fibers $114_{b-d}$ are retractably stored within the housing 104, the unterminated optical fibers $114_{b-d}$ can be pulled out from the housing 104 through the fiber optic cable 112 and the sealed cable entry port 110 to provide fiber access for expanding service capacity over time. The unterminated optical fibers $114_{b-d}$ can be accessed at the access opening 132 such that the stored portion 126 of the unterminated optical fibers $114_{b-d}$ can be pulled from the housing 104 through the fiber optic cable 112 and removed from the fiber optic cable 112 at the access opening 132. The accessed unterminated optical fibers $114_{b-d}$ can be utilized to provide services to new subscribers. In certain examples, the accessed unterminated optical fiber $114_{b-d}$ can be coupled to at least one expansion fiber optic line by: a) an optical splice; b) a demateable connectorized connection; c) an optical splitter or WDM; d) a demateable connection interface including a ruggedized fiber optic adapter.

Figure 10:
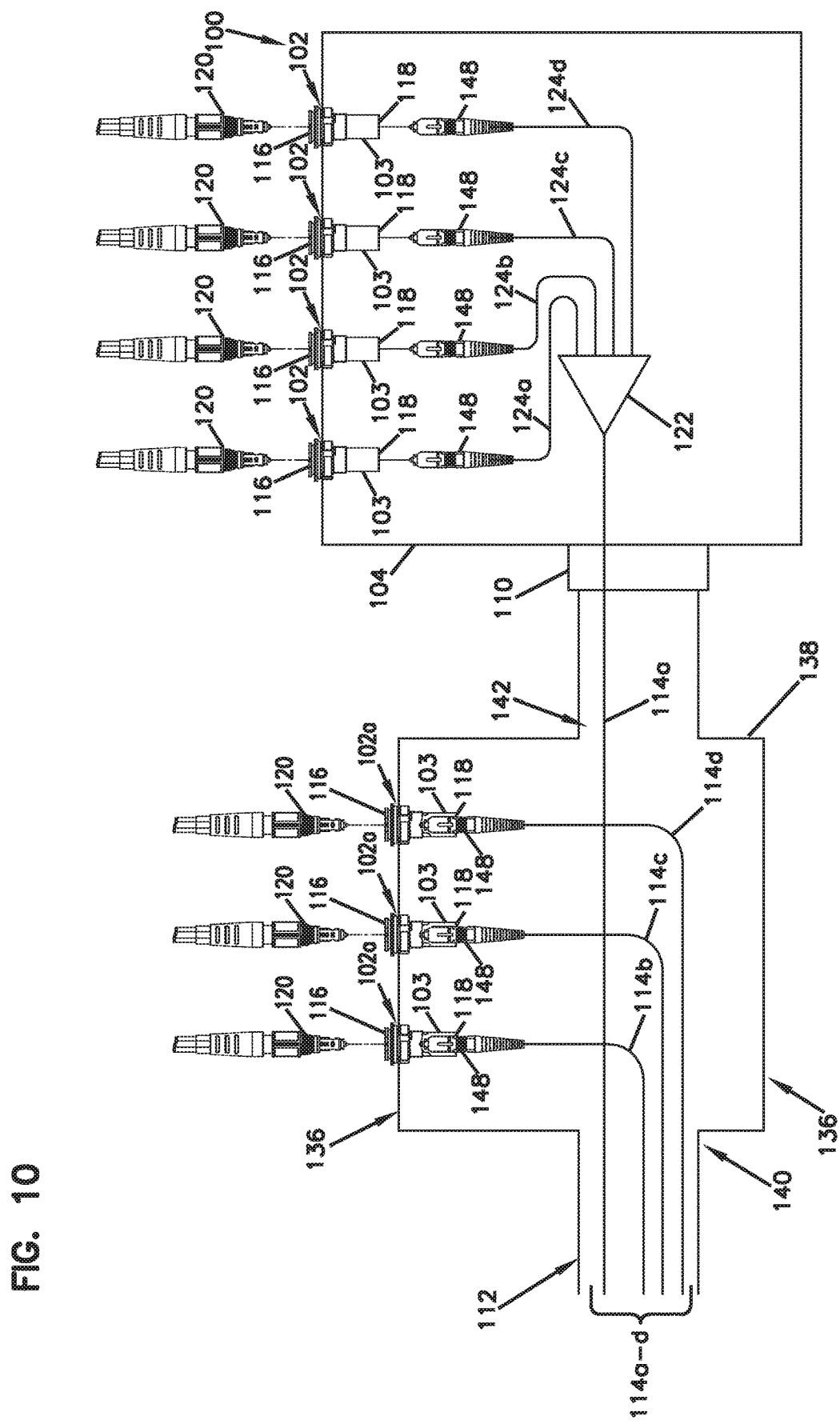
FIG. 10 is a schematic view of the accessed three unterminated optical fibers with a non-ruggedized connector optically coupled to ruggedized fiber optic adaptor ports of an expansion enclosure that is mounted over the access opening of the fiber optic cable.

Referring to FIG. 10, an expansion closure 136 can be arranged and configured to mount over the fiber optic cable 112 and the access opening 132 in the fiber optic cable 112 which is spaced from the housing 104. The expansion closure 136 can be arranged and configured to seal the access opening 132 in order to prevent contaminates (e.g., dust, dirt, oil etc.) from entering therein. The expansion closure 136 can further anchor cable strength members. The strength members may be formed of any suitable material, including a relatively stiff, hard material. Suitable materials for the strength members may include steel or fiberglass. Example configurations for how the seal can look and how the cable strength members can be anchored are described, but are not limited to, those described in U.S. Pat. No. 7,477,826 B2 entitled "Cable Enclosure Assemblies and Methods for Using the Same," which is hereby incorporated by reference herein in its entirety.

In certain examples, the expansion closure 136 can include an in-line pass-through housing 138 that can be configured to allow the terminated optical fibers 114 (e.g., $114_a$) to pass therethrough. That is, the expansion closure 136 has a cable entry and exit 140, 142 that are in line with one another to allow a complete pass through of the optical fibers. In certain examples, the expansion closure 136 can have a wraparound design such that the expansion closure 136 can be mounted laterally over the fiber optic cable 112.

In certain examples, the expansion closure 136 can include one or more of the following therein or thereon: a) an optical splitter or WDM for connection to the accessed unterminated optical fibers, b) a splice support for supporting a splice or splices between the accessed unterminated optical fibers and expansion cables or inputs of power splitters or WDM's, c) sealable cable ports for sealing expansion cables routed to the expansion closure, d) the ruggedized, outside accessible fiber optic adapter or adapters for being optically coupled to the accessed optical fiber or fibers, e) internal fiber optic adapter or adapters for dematably coupling connectorized ends of the accessed fibers to connectorized ends of expansion fibers, splitter inputs, or WDM inputs. In certain examples, the expansion closure 136 may include components an indexing terminal. The WDM of the present disclosure can be configured to power split an input signal into a plurality of signals. The WDM can also be configured to demultiplex a second input signal into a plurality of wavelengths.

The expansion closure 136 may include one or more ruggedized fiber optic adapter ports 102a that are adapted to be used with the unterminated optical fibers $114_{b-d}$. One or more of the unterminated optical fibers $114_{b-d}$ can be optically coupled to the ruggedized fiber optic adapter ports 102a of the expansion closure 136 by splice on connector pigtail or by direct termination. The unterminated optical fibers$_{b-d}$ can be connectorized, for example with the non-ruggedized connectors 148, the non-ruggedized connectors 148 can be plugged into the inner receptacles 118 of the ruggedized fiber optic adapter 103 in the expansion closure 136. The ruggedized fiber optic connectors 120 can be plugged into the outer receptacles 116 of the ruggedized fiber optic adapter 103 in the expansion closure 136. That is, the expansion closure 136 can provide any number of ruggedized fiber optic adapter ports 102a that can be used to connect new subscribers in the network. As such, the cost of expansion can be delayed until such time is desired.

Figure 11:
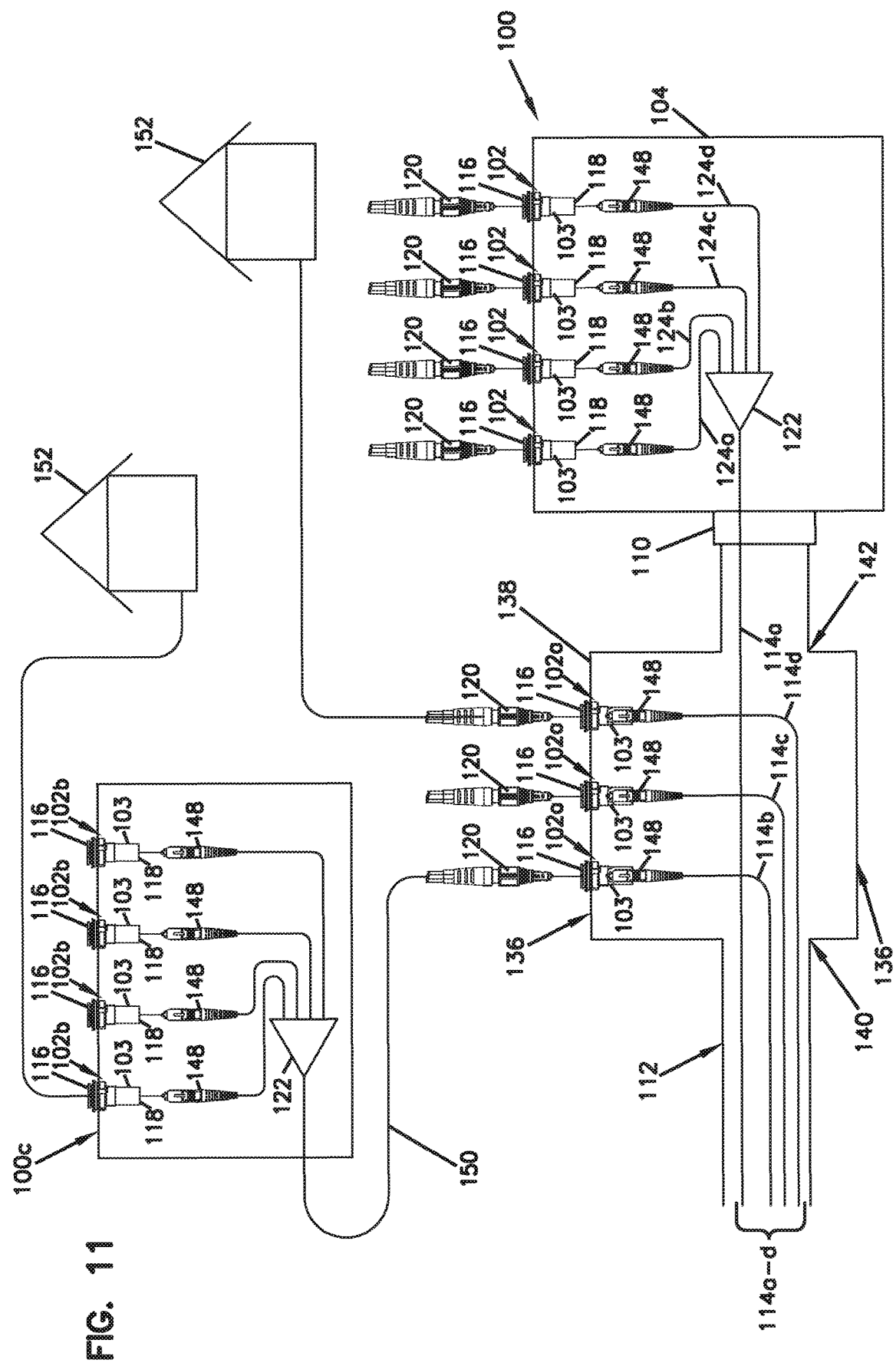
FIG. 11 is a schematic depiction of one connectorized optical fiber being routed to another multiport service terminal, and another connectorized optical fiber being routed directly to a subscriber.

Turning to FIG. 11, a resilient tether 150 having a proximal end connected to the ruggedized fiber optic connector 120 may be routed to another fiber optic drop terminal 100c that has ruggedized fiber optic adapter ports 102b for further expansion capabilities although alternatives are possible. For example, a drop cable can be routed directly from one of the outer receptacles 116 to a subscriber 152.

The present disclosure also relates to a method of using the fiber optic drop terminal 100. The method includes: 1) a step of opening a portion of the jacket 134 of the fiber optic cable 112 to form the access opening 132 (e.g., jacket opening) at a distance X spaced from the housing 104 to expose the plurality of optical fibers 114 contained therein; and 2) a step of pulling at least one unterminated optical fiber 114 from the access opening 132 to pull the stored portion 126 of the at least one unterminated optical fiber 114 out of the housing 104 through the fiber optic cable 112 and out of the fiber optic cable 112 through the access opening 132. In certain examples, the method can further include a step of enclosing the access opening 132 within the expansion closure 136.

Figure 12:
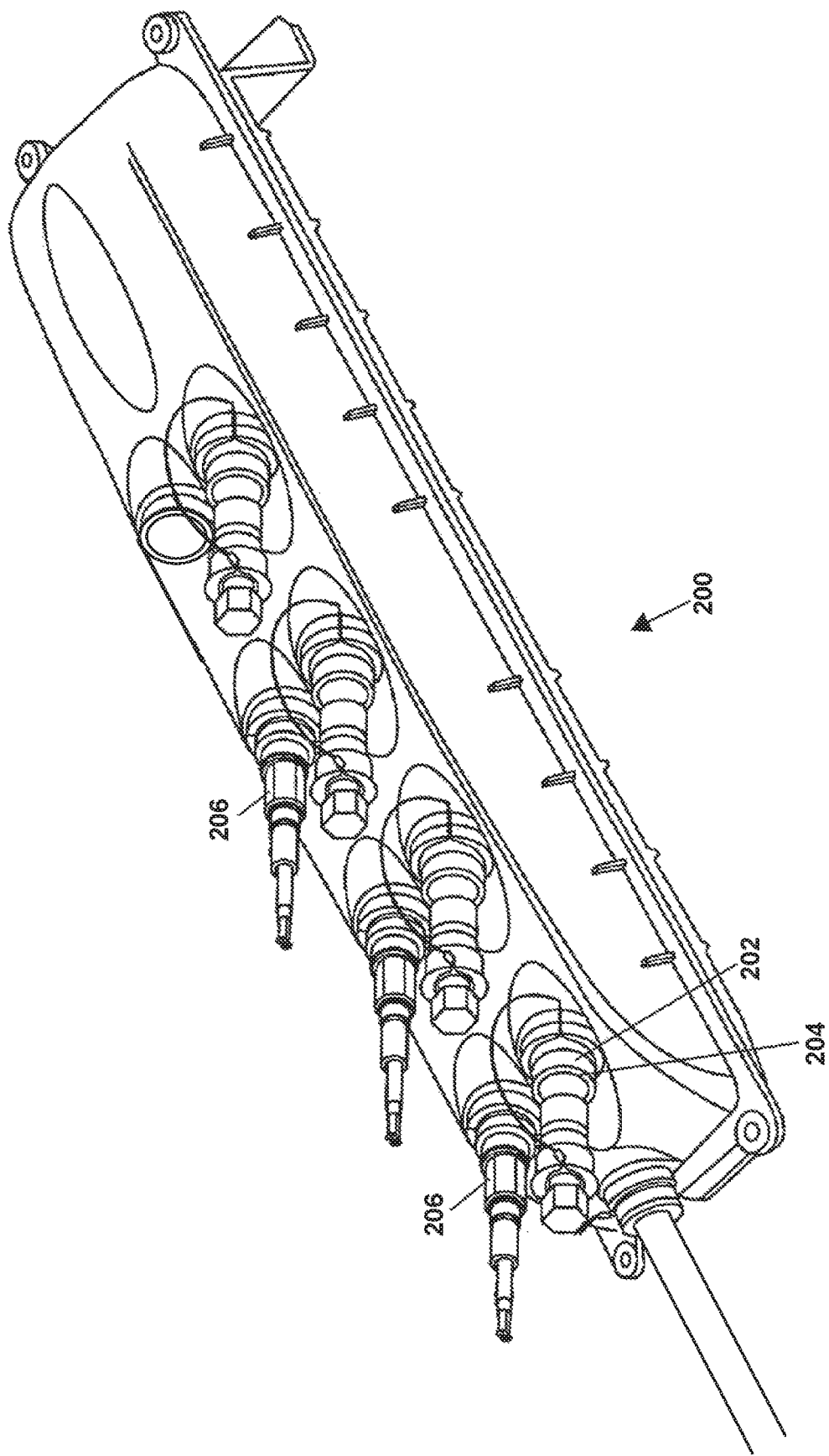
FIG. 12 is a perspective view of a prior art drop terminal having ruggedized fiber optic adapters.

FIG. 12 shows a fiber optic drop terminal 200, including a front face, to which multiple ruggedized fiber optic adapters 202 are mounted. The ruggedized fiber optic adapters 202 include inner ports configured to receive non-ruggedized fiber optic connectors and outer ports 204 configured to receive ruggedized fiber optic connectors 206. The inner ports are accessible from inside the drop terminal 200, and the outer ports 204 are accessible from outside the drop terminal 200. Further details regarding drop terminals and their applications in fiber optic networks are disclosed at U.S. Patent Application Publication No. 2005/0213921, now U.S. Pat. No. 7,292,763, and U.S. Patent Application Publication No. 2006/0093303, now U.S. Pat. No. 7,489,849, which are hereby incorporated by reference in their entireties.

Figure 13:
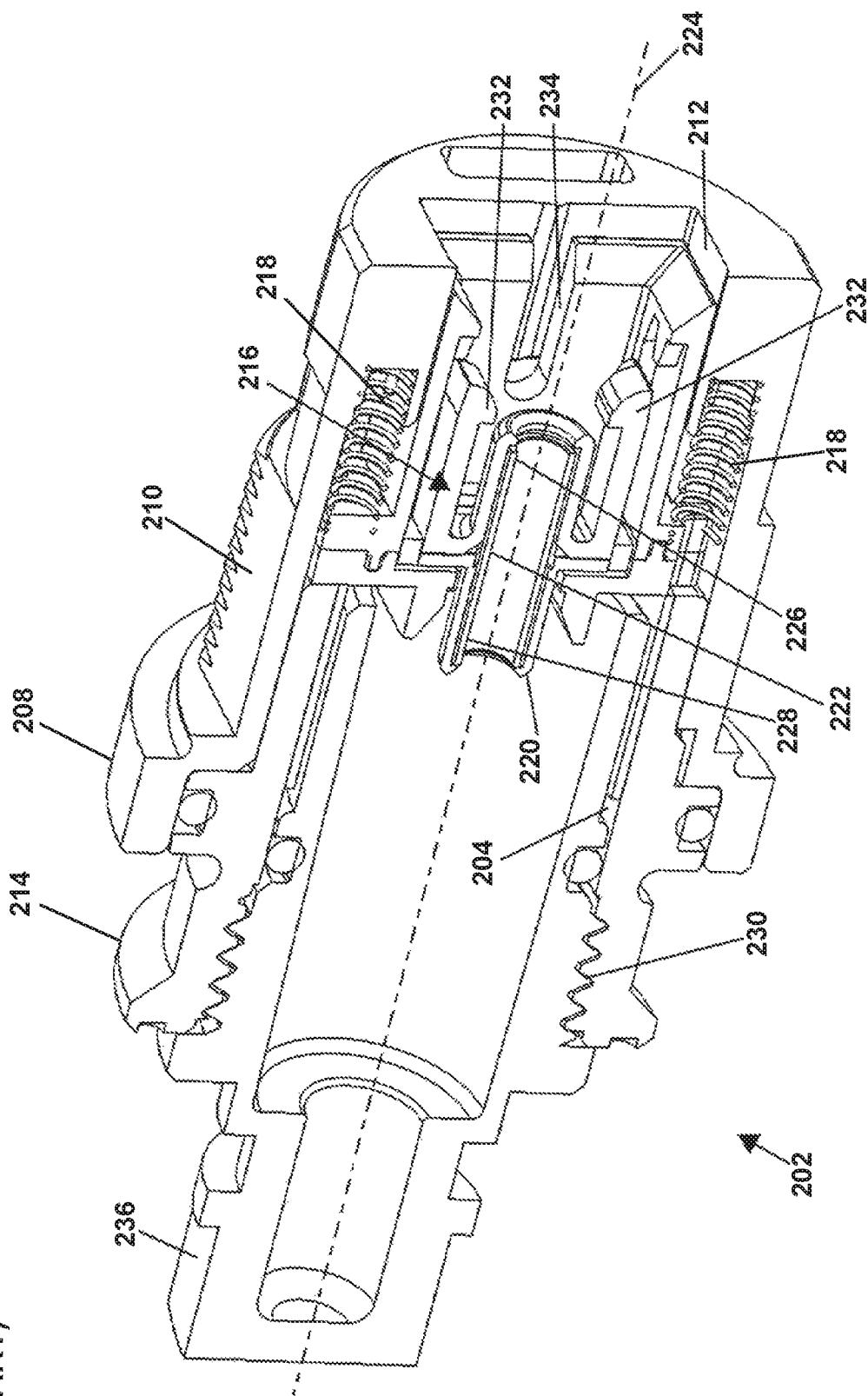
FIG. 13 is a perspective cut-away view cut lengthwise through a ruggedized fiber optic adapter of the type mounted on the drop terminal of FIG. 12.

FIG. 13 illustrates one of the fiber optic adapters 202 in isolation from the drop terminal 200. The fiber optic adapter 202 includes a ruggedized housing 208 having a first piece 210 that defines the inner port 212 of the fiber optic adapter 202 and a second piece 214 that defines the outer port 204 of the fiber optic adapter 202. The first and second pieces 210, 214 can be interconnected by a snap-fit connection to form the ruggedized housing 208. An interior adapter housing 216 mounts inside the ruggedized housing 208. Springs 218 bias the interior adapter housing 216 toward the outer port 204 and allow the interior adapter housing 216 to float within the interior of the ruggedized housing 208.

As shown at FIG. 13, the interior adapter housing 216 includes a cylindrical split sleeve holder 220 that houses a standard split sleeve 222. The split sleeve 222 is coaxially aligned with a center axis 224 of the fiber optic adapter 202. The split sleeve 222 includes an inner end 226 that faces toward the inner port 212 of the fiber optic adapter 202 and an outer end 228 that faces toward the outer port 204 of the fiber optic adapter 202. The fiber optic adapter 202 defines a plurality of internal threads 230 within the outer port 204 for use in securing a ruggedized fiber optic connector within the outer port 204, although alternatives are possible. In certain examples, a bayonet style connection may be used, although any other type of twist-to-lock interface or different type of sealing may also be used. The fiber optic adapter 202 also includes resilient latches 232 for retaining a non-ruggedized fiber optic connector (e.g., a standard SC connector) within the inner port 212. The latches 232 are located adjacent the inner port 212. The interior adapter housing 216 also defines a keying slot 234 adjacent the inner port 212 for ensuring that the non-ruggedized fiber optic connector is inserted into the inner port 212 at the proper rotational orientation. Resilient latches are not provided at the outer port 204. A dust plug 236 is mounted within the outer port 204 of the fiber optic adapter 202 to prevent the adapter from being contaminated when no connector is inserted in the outer port 204. The dust plug 236 can be removed, to allow a connector to be inserted in the outer port 204. Other examples of ruggedized fiber optic adapters are described in the following patents and applications: WO 2016/156610; WO 2016/024014; U.S. Pat. No. 9,482,829; and WO 2015/197588, which are hereby incorporated by reference in their entireties.

Figure 14:
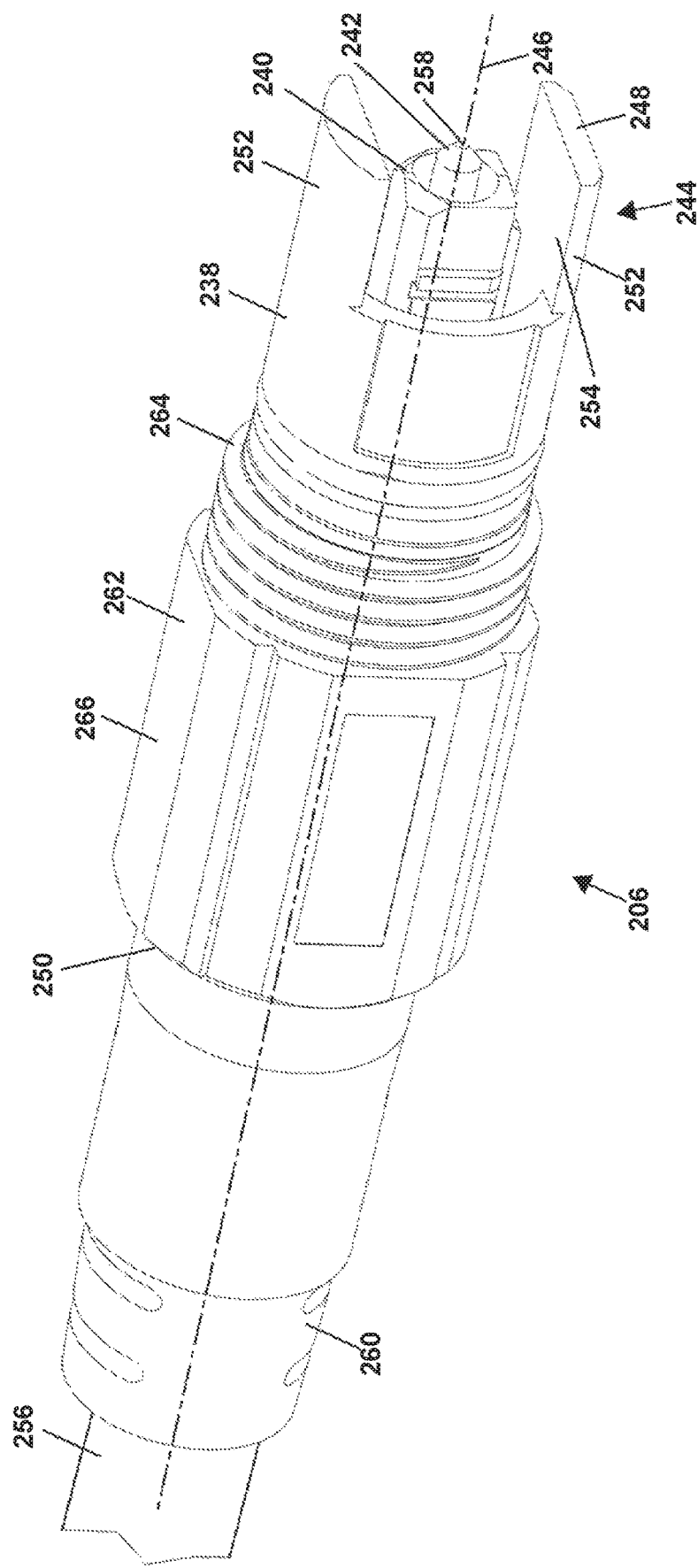
FIG. 14 is a perspective view of a ruggedized fiber optic connector adapted to be inserted in an outer port of the ruggedized fiber optic adapter of FIG. 13.

FIG. 14 illustrates one of the ruggedized fiber optic connectors 206 adapted to be inserted in the outer port 204 of the fiber optic adapter 202. The fiber optic connector 206 includes an outer housing 238 and a connector body 240. The connector body 240 supports a ferrule 242 located at a connector interface end 244 of the fiber optic connector 206. The outer housing 238 of the fiber optic connector 206 is elongated along a central axis 246 and includes a first end 248 positioned opposite from a second end 250. The first end 248 of the outer housing 238 is positioned at the connector interface end 244 of the fiber optic connector 206 and includes a pair of opposing extensions or paddles 252 positioned on opposite sides of the connector body 240. The paddles 252 are generally parallel to the central axis 246 and are separated from one another by a gap 254 in which the connector body 240 is located. The paddles 252 have different shapes and mate with corresponding regions of the outer port 204 to provide a keying function for ensuring that the fiber optic connector 206 is mounted at the proper rotational orientation within the outer port 204. The second end 250 of the outer housing 238 is adapted to receive a fiber optic cable 256 having a fiber 258 that terminates at the ferrule 242. A resilient boot 260 can be positioned over the second end 250 of the outer housing 238 to provide bend radius protection at the interface between the outer housing 238 and the fiber optic cable 256.

Referring still to FIG. 14, the fiber optic connector 206 also includes a retention nut 262 rotatably mounted about the exterior of the outer housing 238. The retention nut 262 is free to be manually turned relative to the outer housing 238 about the central axis 246. The retention nut 262 includes an externally threaded portion 264 and a gripping portion 266. The gripping portion 266 includes a plurality of flats that allow the gripping portion 266 to be easily grasped to facilitate manually turning the retention nut 262 about the central axis 246. To secure the fiber optic connector 206 within the outer port 204 of the fiber optic adapter 202, the threaded portion 264 is threaded into the inner threads 230. When the fiber optic connector 206 is secured within the outer port 204, the ferrule 242 fits within the outer end 228 of the split sleeve 222 of the fiber optic adapter 202.

Figure 15:
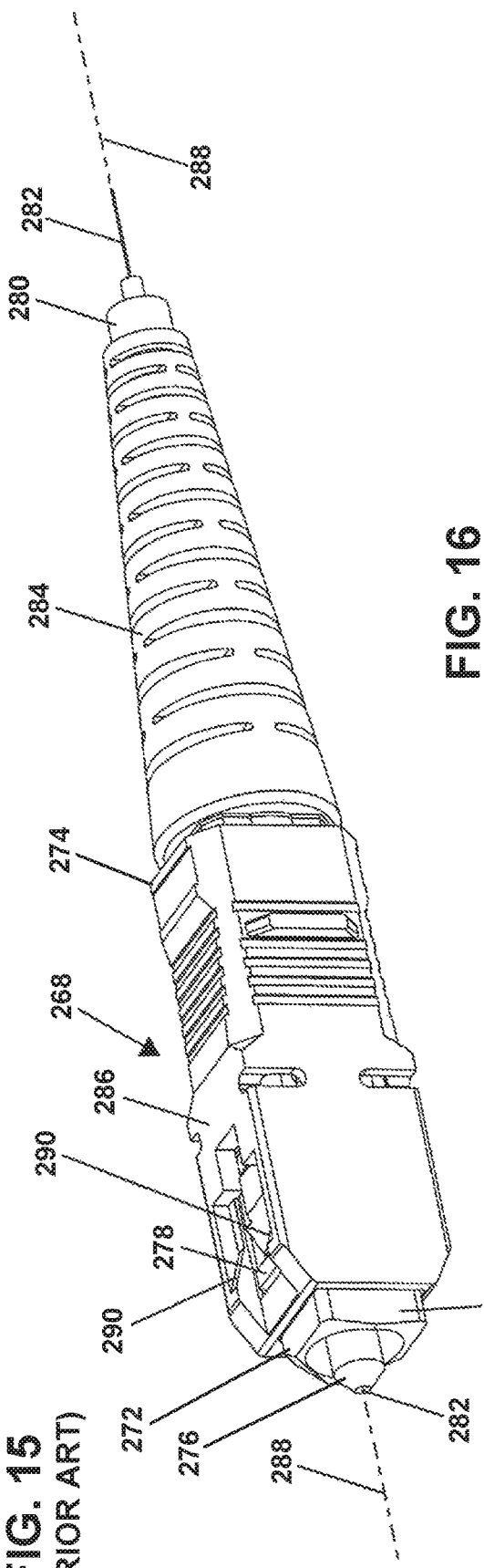
FIG. 15 is a front, top perspective view of a standard non-ruggedized SC fiber optic connector adapted to be inserted in an inner port of the fiber optic adapter of FIG. 13.
Figure 16:
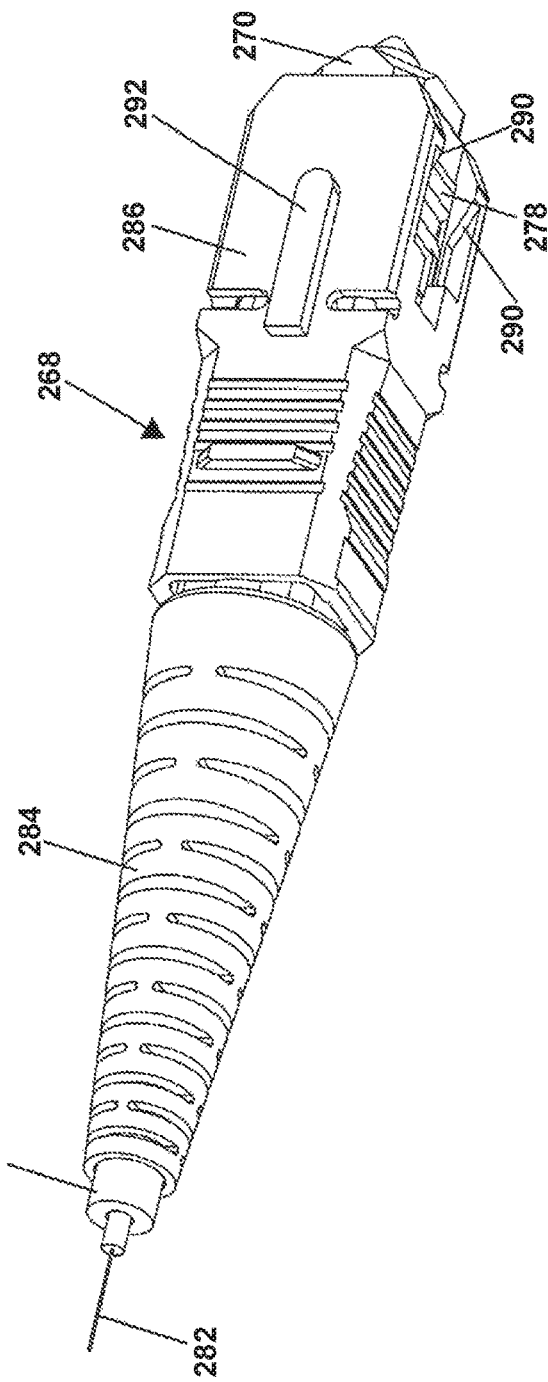
FIG. 16 is a rear, bottom perspective view of the standard non-ruggedized SC fiber optic connector of FIG. 15.

FIGS. 15 and 16 show a standard non-ruggedized SC fiber optic connector 268 adapted to be inserted in the inner port 212 of the fiber optic adapter 202. The connector 268 includes a connector body 270 in which a ferrule assembly is mounted. The connector body 270 includes a first end 272 positioned opposite from a second end 274. The first end 272 provides a connector interface at which a ferrule 276 of the ferrule assembly is supported. Adjacent the first end 272, the connector body 270 includes retention shoulders 278 that are engaged by the resilient latches 232 of the adapter 202 when the connector 268 is inserted in the inner port 212. The latches 232 function to retain the connector 268 within the inner port 212. The second end 274 of the connector body 270 is adapted to receive a fiber optic cable 280 having a fiber 282 that terminates in the ferrule 276. A resilient boot 284 can be positioned at the second end 274 of the connector body 270 to provide bend radius protection at the interface between the connector body 270 and the fiber optic cable 280.

The connector 268 also includes a retractable release sleeve 286 that mounts over the connector body 270. The release sleeve 286 can be slid back and forth relative to the connector body 270 through a limited range of movement that extends in a direction along a longitudinal axis 288 of the connector 268. The release sleeve 286 includes release ramps 290 that are used to disengage the latches 232 from the retention shoulders 278 when it is desired to remove the connector 268 from the inner port 212. For example, by pulling back (i.e., in a direction toward the second end 274 of the connector body 270) on the release sleeve 286 while the connector 268 is mounted in the inner port 212, the release ramps 290 force the latches 232 apart from one another a sufficient distance to disengage the latches 232 from the retention shoulders 278 so that the connector 268 can be removed from the inner port 212. The release sleeve 286 includes a keying rail 292 that fits within the keying slot 234 of the interior adapter housing 216 to ensure proper rotational alignment of the connector 268 within the inner port 212. When the connector 268 is latched within the inner port 212, the ferrule 276 fits within the inner end 226 of the split sleeve 222 of the fiber optic adapter 202. Further details regarding SC-type fiber optic connectors are disclosed at U.S. Pat. No. 5,317,663, which is hereby incorporated by reference in its entirety.

Various modifications and alterations of this disclosure will become apparent to those skilled in the art without departing from the scope and spirit of this disclosure, and it should be understood that the scope of this disclosure is not to be unduly limited to the illustrated examples set forth herein.

What is claimed is:

1. An optical termination enclosure comprising:
 (a) a fiber optic cable including a plurality of optical fibers;
 (b) a housing defining a sealed cable entry port to provide access for the fiber optic cable to be routed therethrough;
 (c) at least one ruggedized fiber optic adapter port provided at the housing, the at least one ruggedized fiber optic adapter port being accessible from outside the housing and being configured to receive a ruggedized fiber optic connector;
 (d) the plurality of optical fibers of the fiber optic cable including at least one terminated optical fiber that is optically coupled to the at least one ruggedized fiber optic adapter port, and at least one unterminated optical fiber; and
 (e) the at least one unterminated optical fiber being retractably stored within the housing, wherein the at least one unterminated optical fiber is configured to be pulled out from the housing through the fiber optic cable and the sealed cable entry port to provide fiber access for expanding service capacity overtimes;
 (f) wherein the housing includes first and second housing pieces, wherein the second housing piece is positioned opposite the first housing piece, the first and second housing pieces together enclosing an interior of the housing, and wherein the second housing piece includes the at least one ruggedized fiber optic adapter port.

2. The optical termination enclosure of claim 1, further comprising an expansion closure for mounting over an access location in the fiber optic cable spaced from the housing, wherein the at least one unterminated optical fiber is accessed at the access location, and a stored portion of the at least one unterminated optical fiber is pulled from the housing through the fiber optic cable and removed from the fiber optic cable at the access location.

3. The optical termination enclosure of claim 1, wherein the at least one terminated optical fiber is optically coupled to the at least one ruggedized fiber optic adapter port through a splitter.

4. The optical termination enclosure of claim 1, wherein the at least one unterminated optical fiber is retractably stored within a retractable storage located within the housing.

5. The optical termination enclosure of claim 4, wherein the retractable storage includes a separate tray for storing the at least one unterminated optical fiber.

6. The optical termination enclosure of claim 4, wherein the retractable storage includes a spool that rotates relative to the retractable storage, and the at least one unterminated optical fiber is coiled about the spool.

7. The optical termination enclosure of claim 4, wherein the retractable storage includes a fixed spool that allows the at least one unterminated optical fiber to be pulled off.

8. The optical termination enclosure of claim 4, wherein the retractable storage temporarily holds the at least one unterminated optical fiber in a configuration that allows the at least one unterminated optical fiber to be pulled out.

9. The optical termination enclosure of claim 8, wherein the configuration is a figure-8 loop configuration.

10. The optical termination enclosure of claim 2, wherein the expansion closure includes an in-line pass-through housing, the at least one terminated optical fiber passing therethrough.

11. The optical termination enclosure of claim 2, wherein the expansion closure has a wraparound design such that the expansion closure can be mounted laterally over the fiber optic cable.

12. The optical termination enclosure of claim 1, wherein the first housing piece defines an inner cavity in which the at least one unterminated optical fiber is disposed.

13. The optical termination enclosure of claim 1, wherein the first and second housing pieces are movable relative to one another between open and closed positions.

14. A method of using the optical termination enclosure of claim 1, the method comprising:
(a) opening a portion of a jacket of the fiber optic cable to form a jacket opening at a distance spaced from the housing to expose the plurality of optical fibers contained therein; and
(b) pulling the at least one unterminated optical fiber from the jacket opening to pull a stored portion of the at least one unterminated optical fiber out of the housing through the fiber optic cable and out of the fiber optic cable through the jacket opening.

15. The method of claim 14, further comprising a step of enclosing the jacket opening within an expansion closure.

16. The method of claim 15, wherein the expansion closure includes at least one ruggedized fiber optic adapter port to which the accessed at least one unterminated optical fiber is optically coupled.

17. The method of claim 14, wherein the accessed at least one unterminated optical fiber is coupled to at least one expansion fiber optic line by: a) an optical splice; b) a demateable connectorized connection; c) an optical splitter or WDM; or d) a demateable connection interface including a ruggedized fiber optic adapter.

18. The method of claim 17, wherein the jacket opening is covered and protected by an expansion closure, and wherein the expansion closure includes one or more of the following therein or thereon: a) an optical splitter or WDM for connection to the accessed at least one unterminated optical fiber; b) a splice support for supporting a splice or splices between the accessed at least one unterminated optical fiber and expansion cables or inputs of power splitters or WDM; c) sealable cable ports for sealing expansion cables routed to the expansion closure; d) a ruggedized, outside accessible fiber optic adapter or adapters for being optically coupled to the accessed optical fiber or fibers; and e) an internal fiber optic adapter or adapters for dematably coupling connectorized ends of the accessed fibers to connectorized ends of expansion fibers, splitter inputs, or WDM inputs.

19. An optical termination enclosure comprising:
(a) a fiber optic cable including a plurality of optical fibers;
(b) a housing defining a sealed cable entry port to provide access for the fiber optic cable to be routed therethrough;
(c) at least one ruggedized fiber optic adapter port provided at the housing, the at least one ruggedized fiber optic adapter port being accessible from outside the housing and being configured to receive a ruggedized fiber optic connector;
(d) the plurality of optical fibers of the fiber optic cable including at least one terminated optical fiber that is optically coupled to the at least one ruggedized fiber optic adapter port, and at least one unterminated optical fiber;
(e) the at least one unterminated optical fiber being retractably stored within the housing, wherein the at least one unterminated optical fiber is configured to be pulled out from the housing through the fiber optic cable and the sealed cable entry port to provide fiber access for expanding service capacity over time; and
(f) an expansion closure for mounting over an access location in the fiber optic cable spaced from the housing, wherein the at least one unterminated optical fiber is accessed at the access location, and a stored portion of the at least one unterminated optical fiber is pulled from the housing through the fiber optic cable and removed from the fiber optic cable at the access location.

20. A method of using an optical termination enclosure, the optical termination enclosure including:
(a) a fiber optic cable including a plurality of optical fibers;
(b) a housing defining a sealed cable entry port to provide access for the fiber optic cable to be routed therethrough;
(c) at least one ruggedized fiber optic adapter port provided at the housing, the at least one ruggedized fiber optic adapter port being accessible from outside the housing and being configured to receive a ruggedized fiber optic connector;
(d) the plurality of optical fibers of the fiber optic cable including at least one terminated optical fiber that is optically coupled to the at least one ruggedized fiber optic adapter port, and at least one unterminated optical fiber; and
(e) the at least one unterminated optical fiber being retractably stored within the housing, wherein the at least one unterminated optical fiber is configured to be pulled out from the housing through the fiber optic cable and the sealed cable entry port to provide fiber access for expanding service capacity over time;
the method comprising:
(a) opening a portion of a jacket of the fiber optic cable to form a jacket opening at a distance spaced from the housing to expose the plurality of optical fibers contained therein; and
(b) pulling the at least one unterminated optical fiber from the jacket opening to pull a stored portion of the at least one unterminated optical fiber out of the housing through the fiber optic cable and out of the fiber optic cable through the jacket opening.

* * * * *